Figure 1:
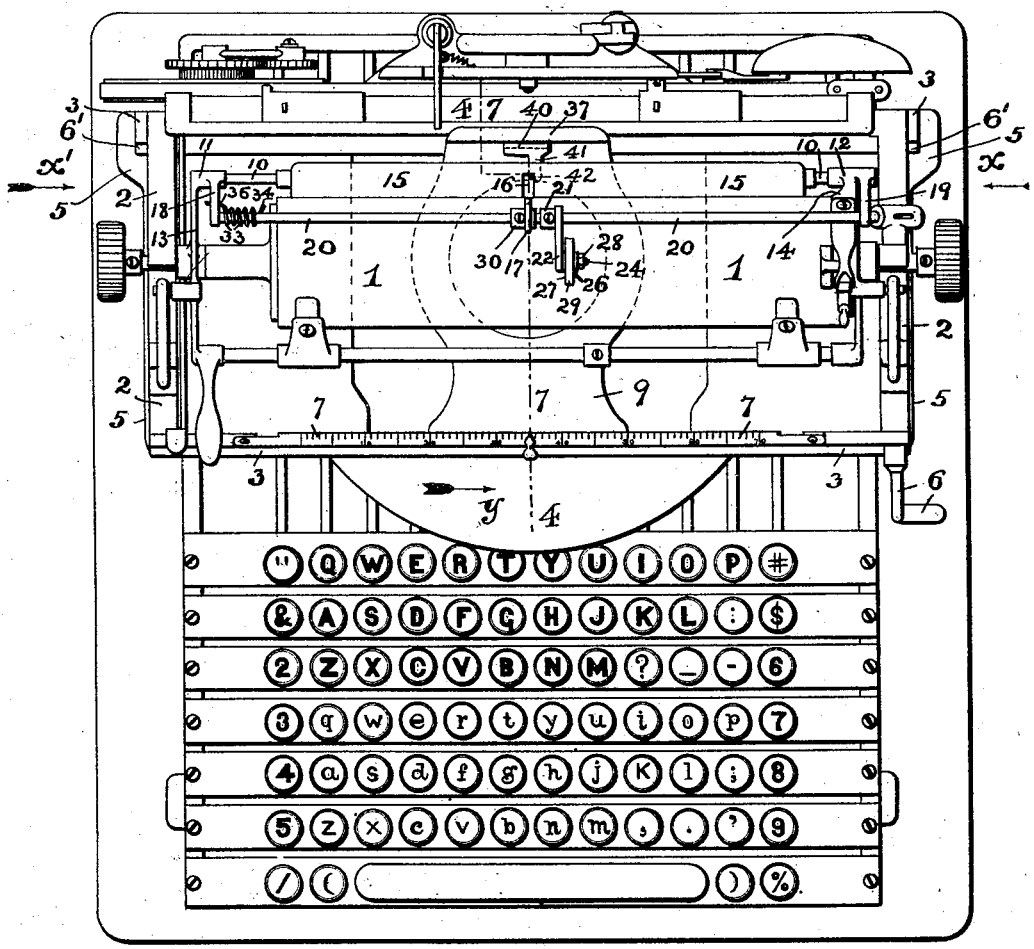

No. 703,509. Patented July 1, 1902.
M. W. WEIR.
TYPE WRITING MACHINE.
(Application filed Dec. 10, 1900.)
(No Model.) 4 Sheets—Sheet 1.

WITNESSES:
Geo. L. Richards
J. Salmon

INVENTOR:
MAX W. WEIR
BY
Fred'k C. Fraentzel,
ATTORNEY

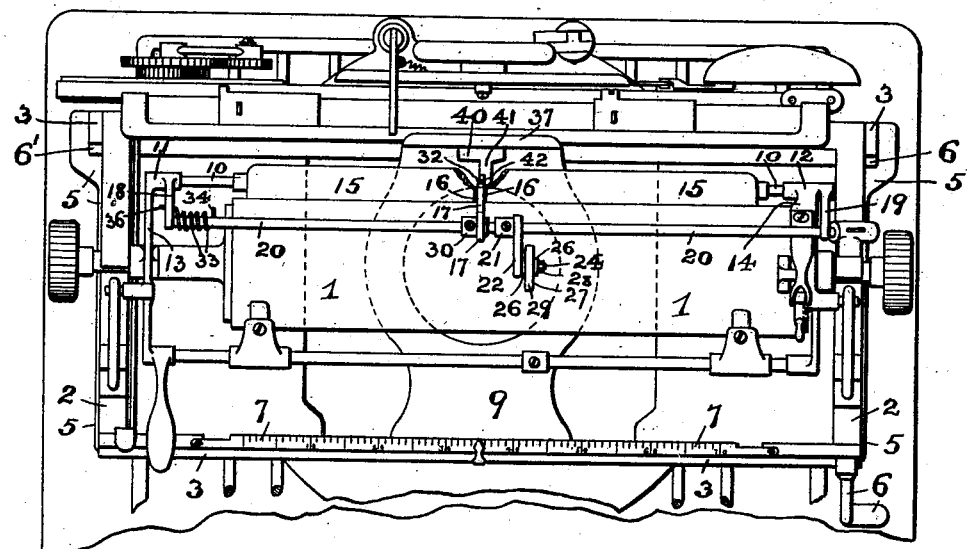

No. 703,509. Patented July 1, 1902.
M. W. WEIR.
TYPE WRITING MACHINE.
(Application filed Dec. 10, 1900.)
(No Model.) 4 Sheets—Sheet 3.

WITNESSES:
Geo. T. Richards
J. Salmon

INVENTOR:
MAX W. WEIR
BY
Fred L. C. Fraentzel,
ATTORNEY

No. 703,509. Patented July 1, 1902.
M. W. WEIR.
TYPE WRITING MACHINE.
(Application filed Dec. 10, 1900.)

(No Model.) 4 Sheets—Sheet 4.

WITNESSES:
Geo. D. Richards
J. Salning

INVENTOR:
MAX W. WEIR
BY
Fred K. C. Fraentzel,
ATTORNEY

UNITED STATES PATENT OFFICE.

MAX W. WEIR, OF NEWARK, NEW JERSEY, ASSIGNOR, BY DIRECT AND MESNE ASSIGNMENTS, TO DENSMORE TYPEWRITER COMPANY, OF SYRACUSE, NEW YORK, A CORPORATION OF NEW YORK.

TYPE-WRITING MACHINE.

SPECIFICATION forming part of Letters Patent No. 703,509, dated July 1, 1902.

Application filed December 10, 1900. Serial No. 39,311. (No model.)

*To all whom it may concern:*

Be it known that I, MAX W. WEIR, a citizen of the United States, residing at Newark, in the county of Essex and State of New Jersey, have invented certain new and useful Improvements in Type-Writing Machines; and I do hereby declare the following to be a full, clear, and exact description of the invention, such as will enable others skilled in the art to which it appertains to make and use the same, reference being had to the accompanying drawings, and to numerals of reference marked thereon, which form a part of this specification.

This invention has reference generally to improvements in that class of printing-machines known as "type-writers;" and the invention relates more particularly to that type or character of type-writer in which the paper is moved forwardly on a platen-roll to receive the impressions of the matrix by a partial revolution of said platen-roll and the alinement and spacing of words are accomplished by a lateral movement of the carriage in which the platen-roll is supported.

The primary object of my invention is to provide an attachment for this type or character of type-writers of any well-known make, whereby the operation of the machine is checked when the page has been completed, locking the carriage upon which the platen-roll is operated, and stopping all further use of the machine until a new sheet of paper to be written or printed upon is inserted.

A further object of this invention, therefore, is to provide a type-writer in which the results attained render the machine superior in the direction of effectiveness of operation and in which the last line of written or printed matter on each and every page of the sheets of paper placed in the machine will be equidistant from the bottom of the page and the written or printed matter will also be in alinement.

My invention consists in the novel means for locking or checking the carriage of a type-writer after the last line has been printed or written on the sheet of paper to stop all further use of the type-writer until a new sheet of paper is inserted or placed in the machine.

The invention consists, furthermore, in the several novel organizations of parts, all of which will be more fully set forth in the accompanying specification, and then finally embodied in the clauses of the claim, which forms a part of this specification.

The several results heretofore set forth are attained by means of mechanism shown in the accompanying drawings illustrative of my invention and wherein similar numerals of reference are employed to designate corresponding parts throughout the several views.

Figure 2:
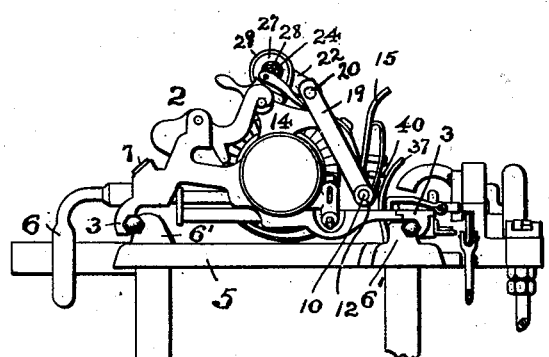
Figure 8:
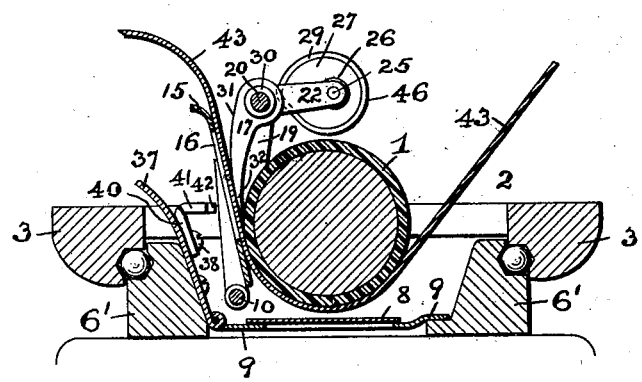
Figure 9:
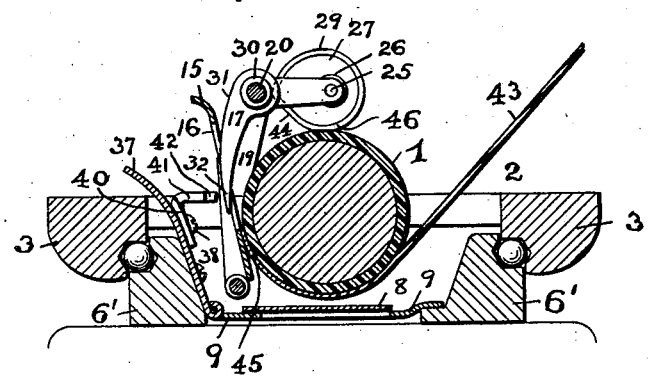
Figure 10:
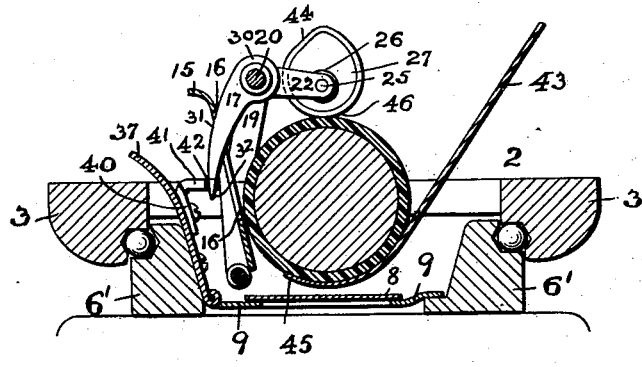
Figure 11:
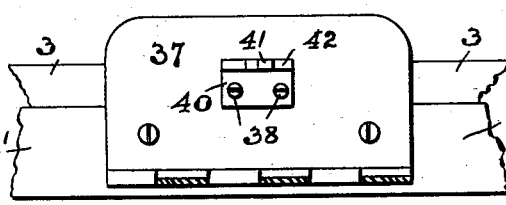
Figure 12:
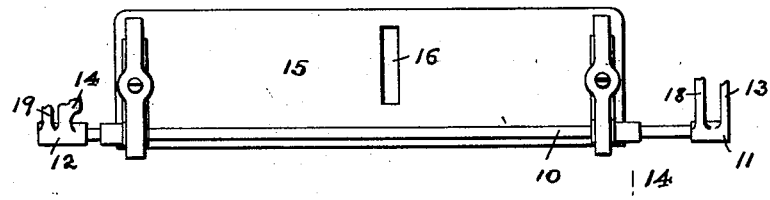
Figure 13:
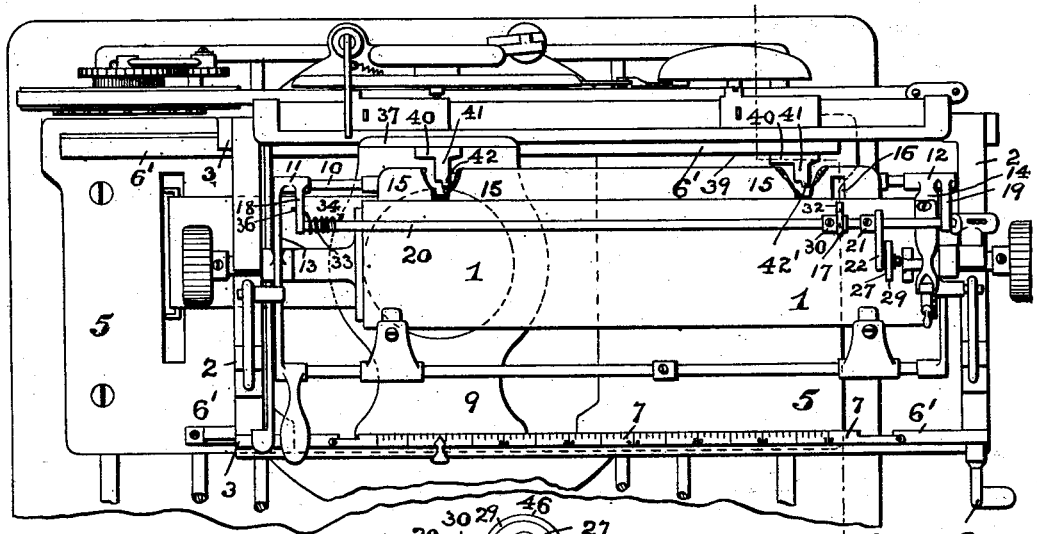
Figure 14:
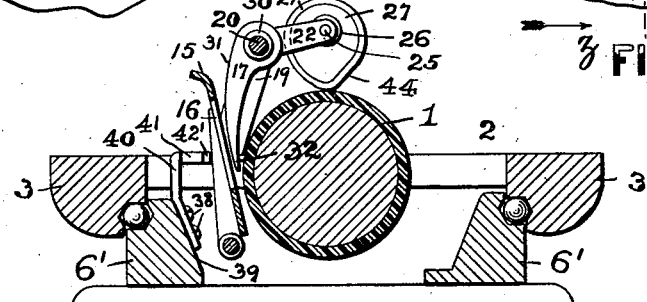
Figure 15:
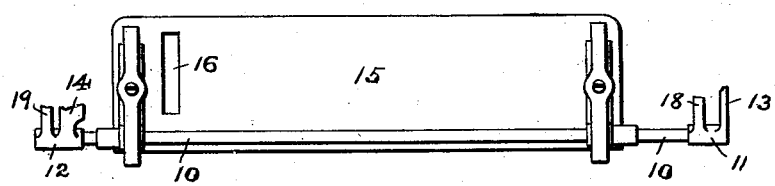

In the said drawings, Figure 1 is a top or plan view of one form of type-writer provided with the device or mechanism embodying the principles of this invention, and Fig. 2 is a side elevation of the machine and said device looking in the direction of arrow $x$ in Fig. 1. Fig. 3 is a plan or top view of a portion of the type-writer provided with the device embodying the features of my invention, the parts of said device being represented in their respective positions for locking the carriage of the type-writer to prevent its being returned laterally to the starting-point; and Fig. 4 is a side elevation of the machine and said device looking in the direction of arrow $x'$ in said Fig. 1. Fig. 5 is a horizontal section, on an enlarged scale, of the principal parts of the mechanism for locking or checking the carriage; and Fig. 6 is a similar section of one end of a rod or shaft on which said locking mechanism is arranged and of the corresponding end of a second rod or shaft connected with the carriage, said view showing in section one form of connection and a spring between the two ends of the said rods or shafts. Fig. 7 is a diagrammatical vertical section, on an enlarged scale, taken on line 7 7 in Fig. 1 and looking in the direction of arrow $y$ in said figure, said view illustrating the normal and relative positions of a cam, a stylus or tongue, and connecting parts, all forming the locking mechanism, with the framework of the machine, the carriage thereon, the platen-roll, and the paper table or guard, and also a suitable stop on the frame of the machine. Figs. 8, 9, and 10 are similar views of the several parts represented in said Fig. 7, said views illustrating the relative positions of the essential parts of mechanism comprising the principal features of my invention; and Fig. 11 is a front view of a stop and parts of the frame of the machine to which said stop is attached. Fig. 12 is a rear view of the paper table or guard and rod on which it is arranged, said table or guard being provided with a slot or opening, so as to enable its use in conjunction with the other parts of my invention. Fig. 13 is a top or plan view of a portion of a type-writer provided with the device embodying the principal features of my present invention and illustrating, in connection with the framework of the type-writer, the use of more than one stop to produce the locked or held condition of the carriage at different points of its lateral movement, according to the space occupied by the words or the symbols printed or written in the last line of the sheet of paper. Fig. 14 is a cross-section, on an enlarged scale, said section being taken on line 14 14 in Fig. 13 and looking in the direction of arrow z in said Fig. 13; and Fig. 15 is a rear view of the paper table or guard and correspondingly-located slot or opening when used with the arrangement of the parts represented in Fig. 13.

Referring to the several figures of the drawings, and more especially to Figs. 1, 3, and 13, the numeral 1 indicates the usual form of platen-roll, mounted and supported so as to be capable of revolution in a frame 2. This frame 2, which is usually termed the "carriage," is provided with guides or rails 3 and has a lateral motion on the slides or rails 6' of the main body or frame 5 of the type-writer. The said lateral motion of the carriage on said slides or rails 6' is caused during the operation of printing or writing and spacing of the words or symbols by means of any suitable mechanism provided for that purpose, and the return by hand of said carriage to the point of commencement of a line to be type-written is produced by the usual form of hand-lever 6 and mechanism well known to those versed in the art pertaining to the various constructions of type-writing machines.

7 indicates the usual space-indicating scale of the carriage.

8 is the printing-ribbon, and 9 is the usual form of ribbon-supporting plate, which may or may not be employed with the type-writer, as desired.

10 indicates a rod or shaft, which has its respective ends suitably secured in bearings 11 and 12, which are connected, by means of the usual arms 13 and 14, in any suitable manner with the parts coöperating with the platen-roll 1. On said rod or shaft 10 is suitably secured the paper table or guard 15, the same for the purposes of my invention, as will be hereinafter more fully set forth, being provided with one or more openings or slots 16 of sufficient size to permit the protrusion of a portion of a stylus or tongue 17 for the purposes to be hereinafter fully described. The said bearings 11 and 12 are also provided with forwardly and upwardly extending arms 18 and 19, (see also Figs. 2 and 4,) which have perforated end portions which form bearings for the reception of the respective ends of a rod or shaft 20, substantially as illustrated in Fig. 6 of the drawings. Of course it will be understood, however, that the said arms 18 and 19 do not necessarily form an integral part of the bearings 11 and 12, and they may be made separate, in which case said arms 18 and 19 can be secured in any well-known manner directly to the rod or shaft 10, as will be clearly understood. Suitably secured upon the said rod or shaft 20 is a sleeve or collar 21, which is provided with a forwardly-extending arm 22. This arm is provided, at or near its free end, as shown in Fig. 5, with a screw-hole 23, in which is secured the screw portion 25 of a stud or pin 24. This stud or pin, however, may form an integral part of the said arm 22, or it may otherwise be secured thereto. Upon said stud or pin 24 are a pair of washers 26, between which is arranged, so as to be capable of a rotary motion on said pin or stud, a cam-disk 27. A nut 28 may be employed for retaining said washers and cam-disk in their respective and operative positions on said stud or pin 24, and the said cam-disk is preferably surrounded by a flexible tire or band 29, made of rubber or other suitable material. The marginal outline or configuration of the said cam-disk 27 is preferably that represented in Figs. 7, 8, 9, 10, and 14 of the drawings; but it will be evident that the said shape may be varied, if desired. Upon said rod or shaft 20 is a second sleeve or collar 30, secured thereon in any desirable manner, the said collar 30 being provided with the downwardly-extending stylus or tongue 17, hereinabove mentioned. This stylus or tongue 17 is preferably provided with the convex back 31 and a free end portion 32, which are placed directly opposite the opening or slot 16 in the paper table or guard 15 to permit the entrance of the end portion 32 and other parts of the stylus or tongue 17 into the said slot or opening 16 in the manner hereinafter more particularly described. As more clearly represented in Fig. 6, the one end of the rod or shaft 20 is encircled by a spring 33, one end 34 of which is secured in a hole 35 in said rod or shaft and the other end 36 of said spring being arranged beneath a portion of the arm 18, as shown; but the said ends 34 and 36 of the spring 33 may be attached in any other desired manner. The object of spring 33 is to properly balance the several parts of said rod or shaft 20 and to cause the stylus or tongue 17 to enter the slot or opening 16 in the paper table or guard 15 at the proper time after the last line has been printed or written, all of which will be set forth in detail hereinafter. Suitably secured to the part 37 of the ribbon-support 9 of the type-writer by means of screws 38 or in any other manner, as indicated in Figs. 7 to 11, inclusive, or directly to the surface 39 of the rear strip of the frame 2, as indicated in Fig. 14 of the drawings, is a block or plate 40, having a forwardly-extending portion 41, which is provided with a lug or stud 42, forming a stop, as clearly illustrated.

From an inspection of Figs. 7 to 10, inclusive, will be noted the possible relative positions of the components parts of the main features of my invention. Fig. 7 shows in general outline the positions of the parts prior to the introduction of the sheet of paper or page 43. Fig. 8 shows the positions of the parts after the sheet of paper or page has been introduced to the position on the platen-roll 1 and during the remainder of the process of type-writing the sheet or page until near the bottom of said sheet or page. Fig. 9 represents the positions of the parts when the rotary motion of the platen-roll has caused the sheet of paper or page to pass beyond the end portion 32 of the stylus or tongue 17, and finally Fig. 10 shows the position of the stylus or tongue 17 in its operative engagement with the stop 42 after the last line has been printed or written on the sheet or page 43, thereby locking the carriage, upon which the platen-roll is operated, and preventing its being pulled back to the initial point of starting a new line of printing.

The operation of the several parts comprising my invention is as follows: By turning the platen-roll 1 in the usual manner the cam-disk 27 is brought into the position indicated in Fig. 7, which raises the arm 22 sufficiently to partially turn the rod or shaft 20 in its bearings and cause the stylus or tongue 17 to assume its place directly in front of and out of the slot or opening 16 in the paper table or guard 15. The sheet of paper 43 to be type-written is inserted in the usual manner in the space between the platen-roll and the paper-table, and the platen-roll is revolved, and thereby carries the paper to the required position for starting the first or top line of printing upon the page. The revolution of the platen-roll 1 in the usual direction of the arrow $u$ (see Fig. 7) causes a corresponding motion of the cam-disk 27 in the direction of the arrow $u'$, thereby bringing a flattened part 44 of said disk and its tire 29 to the position above the platen-roll, as shown in Fig. 8, with the end portion 32 and the convex surface 31 of the stylus or finger 17 resting lightly and in sliding engagement with the surface of the sheet of paper or page which is being written. While thus resting against the sheet of paper and during the further intermittent movements of the paper and during the process of printing or writing line after line, the said cam-disk 27, being perfectly balanced on its pin or stud 24, remains idle and in a position above and away from operative contact with the cylindrical surface of the platen-roll, as clearly illustrated in said Fig. 8. When the platen-roll has revolved sufficiently in the usual manner to carry the end 45 of the sheet of paper or page 43 beyond, or rather below, the end portion 32 of the stylus or tongue 17, the spring 33, connected with the rod or shaft 20, causes the said stylus or tongue 17 to enter the slot or opening 16 in the paper table or guard 15 and brings the portion 46 of the cam-disk and its tire in rotative engagement or contact with the surface of the platen-roll 1, all of which is clearly illustrated in Fig. 9 of the drawings. The position of the stylus or tongue 17 still permits the passage of the stylus or tongue in a lateral direction past the stop 42, and the carriage can be returned to its initial or starting point upon the main frame of the machine for the printing of the last line or a portion of a line on said sheet or page 43. As soon as the matter has been printed the further rotation of the platen-roll, by means of the operation of the handle or lever 6, causes the cam-disk to move from the position indicated in said Fig. 9 to that represented in Fig. 10, and thereby causes the stylus or tongue 17 to protrude farther into the slot or opening 16. In the endeavor to return the carriage to its starting-point the said stylus or tongue will now be brought against the stop 42, as clearly indicated in Figs. 3 and 10, and thereby locks or checks all further movement of the carriage upon which the said platen-roll is mounted. In this manner all further use of the machine is stopped until a new sheet of paper is again placed in position in the carriage in the manner hereinabove described.

As will be noticed from an inspection of Fig. 13, the stylus or tongue 17 and the parts for actuating the same may be placed and secured on any desirable part of the rod or shaft 20. When arranged as indicated in said Fig. 13, the stylus can be brought in its holding or locked engagement with a stop 42', located directly upon the framework of the machine, after the carriage in printing the last line on the sheet of paper or page has moved but a few spaces, which is of advantage in preventing the return of the carriage by the operator when there is but one symbol or a word of two or three letters printed or written in the said last line. As illustrated in the said figure, I may provide the frame of the type-writer with two or more stops, with which the stylus or tongue 17 can be brought in holding or locked engagement at different points of the laterally-sliding motion of the carriage; but ordinarily only one or two stops are necessary to meet all the requirements of my invention. It will also be evident that more than one stylus or tongue may be arranged on rod or shaft 20, if desired.

I am fully aware that several changes may be made in the various arrangements and combinations of the parts, as well as in the details of the construction thereof, without departing from the scope of this invention. Hence I do not limit my invention to the exact arrangements and combinations of the parts as herein described and as illustrated in the accompanying drawings; nor do I confine myself to the exact details of the construction or shapes of any of the said parts.

I do not claim to be the first inventor, in a type-writing machine, of the following broad subject-matter: as a means for notifying the operator that a predetermined point upon a page of writing has been reached, the combination, with a carriage, of a paper-controlled device and a coöperating device, one of said devices being arranged upon the carriage and the other thereof being arranged upon the framework of the machine, and said devices being caused to coact by a movement of the carriage along the framework, nor the combination of a carriage, a part held in an inoperative position by the paper, and means which may be engaged by said part during a longitudinal movement of the carriage after said part has been released by the paper for notifying the operator that a predetermined portion of the page has been reached.

Having thus described my invention, what I claim is—

1. In a type-writer, the combination, with the carriage, a platen-roll, adapted to receive and feed a sheet of paper, and means for rotating said platen-roll and causing a lateral movement of said carriage and platen-roll, of a stop, and means on said carriage held in its inactive position by contact with said sheet of paper, but adapted to engage with said stop and prevent the return of said carriage to its initial starting-point, when released by disengagement with the sheet of paper, substantially as and for the purposes set forth.

2. In a type-writer, the combination, with the carriage, a platen-roll, adapted to receive and feed a sheet of paper, and means for rotating said platen-roll and causing a lateral movement of said carriage and platen-roll, of a stop, and means on said carriage held in its inactive position by contact with said sheet of paper, but adapted to engage with said stop and prevent the return of said carriage to its initial starting-point, consisting, essentially, of a stylus or tongue, and means for actuating said stylus or tongue and causing the same to engage with said stop, when said stylus or tongue is disengaged from contact with the sheet of paper, substantially as and for the purposes set forth.

3. In a type-writer, the combination, with the carriage, a platen-roll, and means for rotating said platen-roll and causing a lateral movement of said carriage and platen-roll, of a stop, a cam-disk in rotative engagement with said platen-roll, and means operated from said cam-disk, adapted to be brought into engagement with said stop and to prevent the return of said carriage to its initial starting-point, substantially as and for the purposes set forth.

4. In a type-writer, the combination, with the carriage, a platen-roll, and means for rotating said platen-roll and causing a lateral movement of said carriage and platen-roll, of a stop, a cam-disk in rotative engagement with said platen-roll, and a stylus or tongue operated from said cam-disk, adapted to be brought into holding engagement with said stop and to prevent the return of said carriage to its initial starting-point, substantially as and for the purposes set forth.

5. In a type-writer, the combination, with the carriage, a platen-roll and means for rotating said platen-roll and causing a lateral movement of said carriage and platen-roll, of a stop, a rod on said carriage, an arm extending from said rod, a cam-disk on said arm in rotative engagement with said platen-roll, and means on said rod adapted to be actuated by said cam-disk and brought into engagement with said stop to prevent the return of said carriage to its initial starting-point, substantially as and for the purposes set forth.

6. In a type-writer, the combination, with the carriage, a platen-roll and means for rotating said platen-roll and causing a lateral movement of said carriage and platen-roll, of a stop, a rod on said carriage, an arm extending from said rod, a cam-disk on said arm in rotative engagement with said platen-roll, and a stylus or tongue on said rod adapted to be actuated by said cam-disk and brought into holding engagement with said stop and to prevent the return of said carriage to its initial starting-point, substantially as and for the purposes set forth.

7. In a type-writer, the combination, with the carriage, a platen-roll and means for rotating said platen-roll and causing a lateral movement of said carriage and platen-roll, of a stop, a rod 10 in said carriage, a pair of upwardly-extending arms on said rod 10, a second rod 20 supported by said arms, a cam-disk supported from said rod 20 and in rotative engagement with said platen-roll, and means operated from said cam-disk, adapted to be brought into engagement with said stop and to prevent the return of said carriage to its initial starting-point, substantially as and for the purposes set forth.

8. In a type-writer, the combination, with the carriage, a platen-roll and means for rotating said platen-roll and causing a lateral movement of said carriage and platen-roll, of a stop, a rod 10 in said carriage, a pair of upwardly-extending arms on said rod 10, a second rod 20 supported by said arms, an arm 22 on said rod 20 provided with a stud or pin, a cam-disk on said stud or pin in rotative engagement with said platen-roll, and means on said rod 20 adapted to be actuated by said cam-disk and brought into engagement with said stop to prevent the return of said carriage to its initial starting-point, substantially as and for the purposes set forth.

9. In a type-writer, the combination, with the carriage, a platen-roll and means for rotating said platen-roll and causing a lateral movement of said carriage and platen-roll, of a stop, a rod 10 in said carriage, a pair of upwardly-extending arms on said rod 10, a second rod 20 supported by said arms, an arm 22 on said rod 20 provided with a stud or pin, a cam-disk on said stud or pin in rotative engagement with said platen-roll, and a stylus or tongue on said rod 20 adapted to be actuated by said cam-disk and brought into holding engagement with said stop and to prevent the return of said carriage to its initial starting-point, substantially as and for the purposes set forth.

10. In a type-writer, the combination, with the frame thereof, and a platen-roll, adapted to receive a sheet of paper, of a cam-disk in rotative engagement with said platen-roll, and means adapted to be actuated by said cam-disk and to lock the parts when the sheet has been type-written to prevent further use of the type-writer until a new sheet of paper is inserted, substantially as and for the purposes set forth.

11. In a type-writer, the combination, with the frame thereof, and a platen-roll, adapted to receive a sheet of paper, of a cam-disk in rotative engagement with said platen-roll, and a stylus or tongue adapted to be actuated by said cam-disk and to engage a part of the machine-frame when the sheet has been type-written to prevent further use of the type-writer until a new sheet of paper is introduced, substantially as and for the purposes set forth.

12. In a type-writer, the combination, with a movable carriage, the platen-roll, adapted to receive and feed a sheet of paper, and a paper table or guard having a slot or opening, of a stop, and means on said carriage held in its inactive position by contact with said sheet of paper, but adapted to engage with said stop and prevent the return of said carriage to its initial starting-point, consisting, of a stylus or tongue movably arranged in front of the slot or opening in the paper table or guard, and means for actuating said stylus or tongue for moving said stylus or tongue into and through the said slot or opening and causing said stylus to engage with said stop, when said stylus or tongue is disengaged from contact with the sheet of paper, substantially as and for the purposes set forth.

13. In a type-writer, the combination, with a movable carriage, the platen-roll, and a paper table or guard having a slot or opening, of a stop, and means on said carriage adapted to engage with said stop and prevent the return of said carriage to its initial starting-point, consisting, of a stylus or tongue movably arranged in front of the slot or opening in the paper table or guard, and a cam-disk in rotative engagement with said platen-roll for actuating said stylus or tongue for moving said stylus or tongue into and through the said slot or opening and causing said stylus or tongue to engage with said stop, substantially as and for the purposes set forth.

14. In a type-writer, the combination, with a movable carriage, the platen-roll, and a paper table or guard having a slot or opening, of a stop, a cam-disk in rotative engagement with said platen-roll, a stylus or tongue, and a spring-actuated rod on which said stylus or tongue is placed, so as to move in front of said slot or opening in the paper table or guard, and a means of connection between said cam-disk and said rod for moving said stylus or tongue into and through the said slot or opening and causing the stylus or tongue to engage with said stop, substantially as and for the purposes set forth.

In testimony that I claim the invention set forth above I have hereunto set my hand this 8th day of December, 1900.

MAX W. WEIR.

Witnesses:
FREDK. C. FRAENTZEL,
GEO. D. RICHARDS.